United States Patent
Berkey et al.

(10) Patent No.: US 6,883,351 B2
(45) Date of Patent: Apr. 26, 2005

(54) METHOD FOR FABRICATING A LOW POLARIZATION MODE DISPERSION OPTICAL FIBER

(75) Inventors: George E. Berkey, Pine City, NY (US); David T. Marlowe, Wilmington, NC (US); Douglas G. Neilson, Wilmington, NC (US); Jeffrey C. Nelson, Burgaw, NC (US)

(73) Assignee: Corning Incorporated, Corning, NY (US)

(*) Notice: Subject to any disclaimer, the term of this patent is extended or adjusted under 35 U.S.C. 154(b) by 315 days.

(21) Appl. No.: 10/200,798

(22) Filed: Jul. 22, 2002

(65) Prior Publication Data

US 2003/0024278 A1 Feb. 6, 2003

Related U.S. Application Data

(60) Provisional application No. 60/309,160, filed on Jul. 31, 2001.

(51) Int. Cl.⁷ .............................................. C03B 37/018
(52) U.S. Cl. ........................................ 65/428; 65/421
(58) Field of Search .................... 65/417, 435, 421, 65/427, 418, 412, 413, 419, 428

(56) References Cited

U.S. PATENT DOCUMENTS

| | | | |
|---|---|---|---|
| 3,907,536 A | * 9/1975 | Achener | 65/60.8 |
| 4,154,591 A | 5/1979 | French et al. | 65/2 |
| 4,154,592 A | 5/1979 | Bailey | 65/2 |
| 4,157,906 A | 6/1979 | Bailey | 65/3 |
| 4,229,070 A | 10/1980 | Olshansky et al. | 350/96.31 |
| 4,233,052 A | 11/1980 | Dominick et al. | 65/144 |
| 4,251,251 A | 2/1981 | Blankenship | 65/3 |
| 4,263,031 A | 4/1981 | Schultz | 65/3 |
| 4,286,978 A | 9/1981 | Bailey et al. | 65/3 |
| 4,298,364 A | * 11/1981 | Blaszyk et al. | 65/419 |
| 4,310,339 A | 1/1982 | Blankenship | 65/3.12 |
| 4,331,462 A | * 5/1982 | Fleming et al. | 65/391 |
| 4,360,371 A | 11/1982 | Blankenship et al. | 65/3.12 |
| 4,426,129 A | 1/1984 | Matsumura et al. | 350/96.33 |
| 4,505,729 A | 3/1985 | Matsumura et al. | 65/3.11 |
| 4,561,871 A | 12/1985 | Berkey | 65/3.11 |
| 4,578,097 A | 3/1986 | Berkey | 65/3.11 |
| 4,636,235 A | 1/1987 | Glessner et al. | 65/3.12 |
| 4,636,236 A | 1/1987 | Glessner et al. | 65/3.12 |
| 4,668,264 A | 5/1987 | Dyott | 65/3.11 |
| 4,859,222 A | 8/1989 | Bauch et al. | 65/3.12 |
| 5,149,349 A | 9/1992 | Berkey et al. | 65/3.11 |
| 5,152,818 A | 10/1992 | Berkey et al. | 65/3.11 |
| 5,868,815 A | * 2/1999 | DiGiovanni et al. | 65/382 |
| 6,089,044 A | 7/2000 | Hardy et al. | 65/408 |
| 6,477,305 B1 | 11/2002 | Berkey et al. | 385/123 |
| 2003/0024278 A1 | 2/2003 | Berkey et al. | 65/428 |
| 2003/0115908 A1 * | 6/2003 | Hammerle et al. | 65/379 |

FOREIGN PATENT DOCUMENTS

| | | | |
|---|---|---|---|
| DE | 34 47 081 | 12/1985 | C03B/37/075 |
| DE | 34 47 082 | 12/1985 | C03B/37/025 |
| DE | 36 35 819 | 5/1988 | C03B/37/027 |
| EP | 1 035 083 A1 | 9/2000 | C03B/37/018 |
| GB | 1555562 | * 11/1979 | |
| GB | 2 178 737 | 2/1987 | C03B/37/08 |
| WO | WO 00/64824 | 11/2000 | C03B/37/00 |

OTHER PUBLICATIONS

EPO Patent Abstract of Japan, Publication No. 01160841, Jun. 23, 1989, Application No. 62316072 in the name of Sumitomo Electric Ind Ltd., "Production of Optical Fiber".

* cited by examiner

Primary Examiner—Peter Chin
Assistant Examiner—Carlos Lopez
(74) Attorney, Agent, or Firm—Joseph M. Homa

(57) ABSTRACT

The method of fabricating an optical waveguide fiber from a preform having a centerline aperture which includes reducing the pressure in the centerline aperture, then increasing the pressure in the centerline aperture to a pressure in order to improve uniformity, circularity, and/or symmetry around the centerline aperture region.

15 Claims, 12 Drawing Sheets

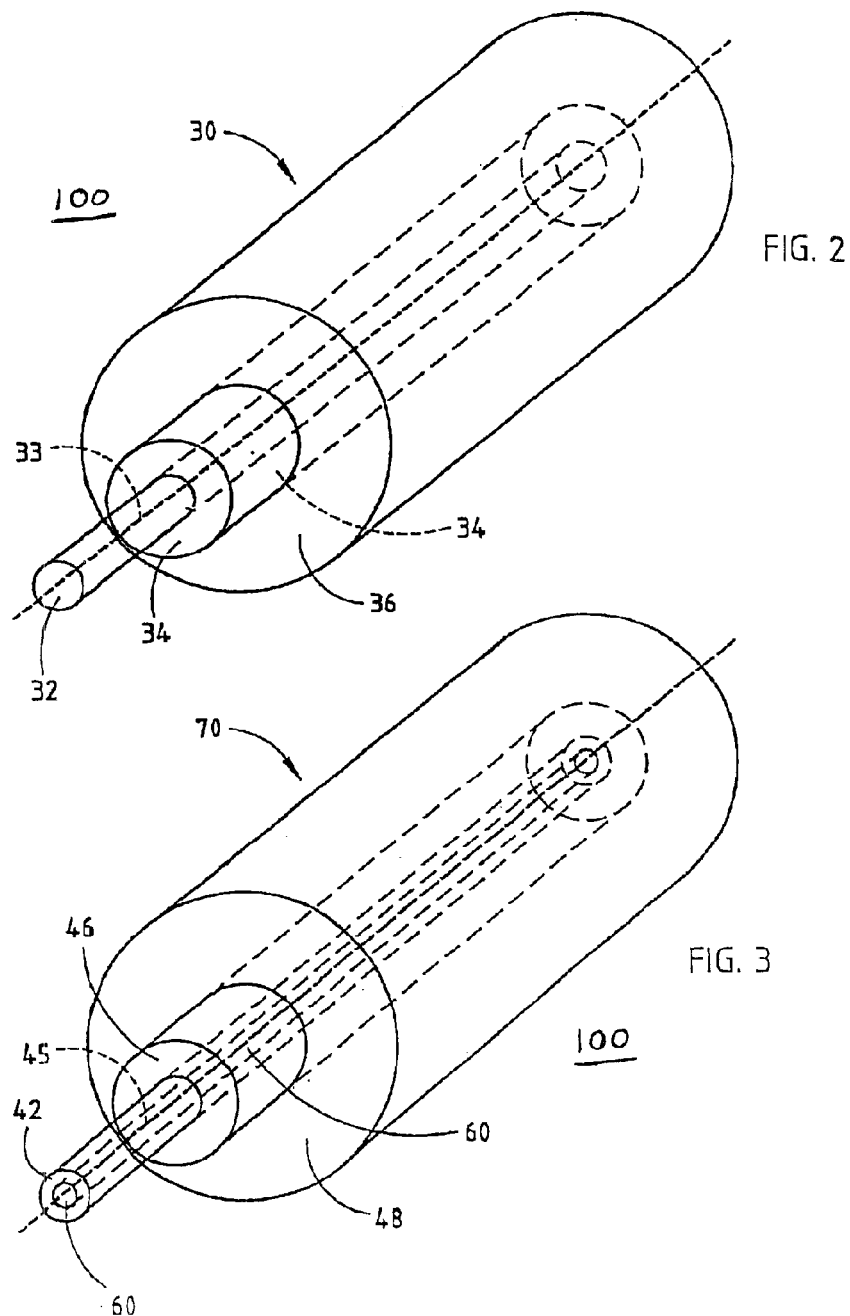

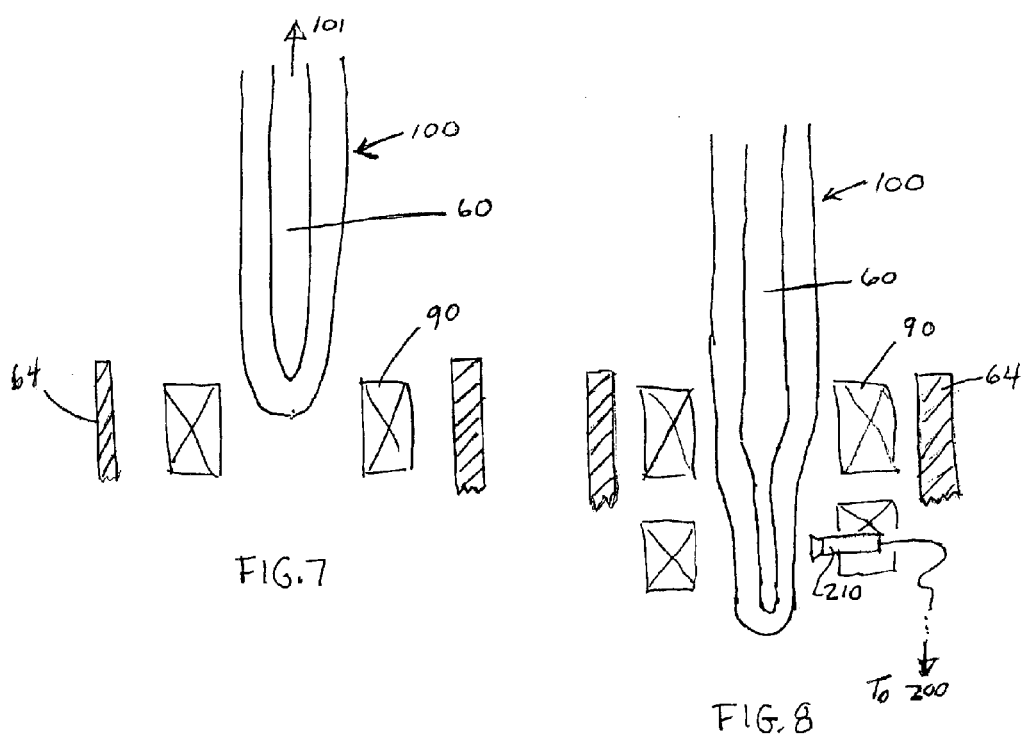

METHOD FOR FABRICATING A LOW POLARIZATION MODE DISPERSION OPTICAL FIBER

CROSS-REFERENCE TO RELATED APPLICATIONS

This application claims the benefit of priority under 35 U.S.C. §119 (e) of U.S. Provisional Application Ser. No. 60/309,160 filed on Jul. 31, 2001.

BACKGROUND OF THE INVENTION

1. Field of the Invention

The present invention relates generally to the field of optical waveguide fibers, and more particularly to methods of making low polarization-mode dispersion optical waveguide fibers.

2. Technical Background

A significant goal of the telecommunications industry is to transmit greater amounts of information, over longer distances, in shorter periods of time. Typically, as the number of systems users and frequency of system use increases, demand for system resources increases as well. One way of meeting this demand is by increasing the bandwidth of the medium used to carry the information. In optical telecommunication systems, the demand for optical waveguide fibers having increased bandwidth is particularly high.

An optical fiber is typically formed from a silica-based preform. The preform may be manufactured, at least in part, by depositing silica soot or silica plasma onto a receptor surface and building up layers of silica, wherein the soot stream attaches to the receptor surface either in soot form, as in an OVD process, or in fused silica form, as in an MCVD process. The receptor surface is typically a mandrel (e.g. the outer surface of a ceramic bait rod) or a tube of fused silica (e.g. the inside surface of the tube in an MCVD process). The receptor surface is typically rotatable or rotating during deposition. Prior to consolidation, the mandrel or bait rod is separated from the preform, leaving a center hole. After consolidation, additional layers of silica soot, e.g. overclad or additional core material, may be applied and added to the preform. Preforms which at least partially contain soot are eventually consolidated into fused silica before being drawn into an optical fiber. Some preforms are made by a rod in tube process wherein a fused silica rod is inserted into the central opening of a fused silica core.

In the manufacturing of an optical fiber, a variety of methods can be used to deposit the various soot layers of a preform.

In the outside vapor deposition ("OVD") process, an unconsolidated soot preform such as a soot core blank, is formed by depositing silica and germanium containing precursor constituents in the presence of oxygen onto a substrate, such as a mandrel, or a target rod, typically a ceramic bait rod. As the bait rod is rotated, the precursor constituents are delivered to the flame burner to produce soot, and that soot is then deposited onto the bait rod. The soot may be a combination of silica and silica-doped soot. Once sufficient soot is deposited, the bait rod is removed, and the resultant soot core blank can be consolidated into a fused silica preform such as a core rod preform or core cane preform or cane preform or glass core blank. The soot core blank is typically consolidated by hanging the soot core blank in a consolidation furnace and heating the soot core blank to a temperature and for a time sufficient to consolidate the soot core blank into a glass. Preferably, prior to the consolidating step, the soot core blank is chemically dried, for example, by exposing the soot core blank to chlorine gas at an elevated temperature. The result is a generally cylindrical glass core blank or glass cane preform having an axial hole along its centerline, or centerline hole, or centerline aperture. That is, the generally cylindrical consolidated glass tube has a centerline aperture. Typically, the glass core blank or glass cane preform has a length of about 0.5 m to 1.0 m, with an inside diameter of about 0.5 to about 3.0 cm, and an outside diameter of about 3 to 8 cm. Although these dimensions vary according to process and product requirements, various sizes and even shapes of glass core blank or glass cane preform can benefit from the present invention as set forth hereinbelow.

The glass core blank or glass cane preform is then typically "redrawn", i.e. drawn in to a reduced diameter preform, e.g., by positioning the glass core blank in a furnace, heating the core blank to a temperature of approximately 2000° C., and then redrawing or pulling or stretching the core blank into a smaller diameter core cane. The thermal energy softens the glassy blank or preform which, in tandem with pulling on the preform, results in a necking down of the preform, i.e. necking of both the outer diameter and the inner diameter.

During the redraw operation, the centerline aperture of the core blank is typically collapsed by applying considerable vacuum (e.g., a pressure of less than 25 kPa or 0.25 atm) along the centerline aperture. These vacuum forces ensure complete closure of the glass core blank along the centerline. Typically, drawing or pulling on the preform without the assistance of vacuum is insufficient to close or collapse the hole.

After the redraw step, the resulting core cane is then typically clad with one or more additional core soot layers and/or overclad with a layer of cladding by depositing a cladding soot thereon, e.g. via an OVD deposition process. Once covered with sufficient cladding soot, the resultant soot overclad core cane is chemically dried and consolidated to form an optical fiber preform or optical fiber blank. While different processes (e.g. MCVD and others) may employ somewhat different processes to form components employed in the manufacture of preforms, many of these processes (e.g. MCVD) commonly result in a cylindrical tube or other intermediate glass object or preform having a hole therein, which is closed prior to drawing optical fiber therefrom. These manufacturing processes typically involve utilizing a vacuum at some point during the manufacturing process to close the centerline aperture without changing the outer diameter significantly.

The use of a relatively strong vacuum to close the centerline and other apertures in a glass core blank or other optical fiber preforms typically presents difficulties. Such vacuum forces can result in a non-symmetrical centerline profile of the cane, as shown, for example, in FIG. 1. The application of strong vacuum to the centerline aperture region can result in a non-circular collapse of the hole. FIG. 1 illustrates a cross section of core cane, indicated generally at 10, which includes a center point 12 surrounded by layers of glass 14. In FIG. 1, these glass layers 14 have an irregular, asymmetric shape, as a result of the application of strong vacuum forces which result in the full collapse of the centerline aperture. Only at locations farther from the center point 12 do the layers of glass 16 begin to form more symmetrical and concentric circles or rings about the center point 12. The same non-symmetrical layers of glass present in the core cane will be present when that cane is eventually drawn into an optical fiber. Views of the centerline profile taken at different locations along the length of the core cane (or the optical fiber resulting therefrom) would also show core asymmetry. Further, the geometrical properties of the core cane and resultant optical fiber may change along the length thereof. More specifically, the specific asymmetrical shape at one location along the optical fiber might differ from the shape at another location along the optical fiber.

Asymmetric core geometry is believed to be a key cause of polarization mode dispersion (PMD), a form of dispersion which results when one component of light travels faster than another, orthogonal component. The occurrence of PMD which is present to any significant degree, especially in single mode fibers, is a severe detriment because PMD limits the data transmission rate of fiber-based telecommunications systems. More specifically, single mode fibers and multimode fibers typically both have an outside diameter of generally about 125 microns. However, single mode fibers have a relatively small core diameter, e.g., about 8 microns. Because of this dimensional relationship, single mode fibers are extremely sensitive to polarization mode dispersion brought on by non-symmetric hole closure caused during fiber manufacture. Consequently, reduced PMD is a significant goal in fiber manufacture, especially in single mode fibers. In contrast to the small core size of single mode fibers, the core region of a multimode fiber typically has a diameter of 62.5 microns or 50 microns. PMD is also deleterious in multimode fibers. In multimode fibers, non-symmetric hole closure has resulted in the inability to tune refractive index profiles on the innermost portion of the fiber adjacent the centerline. As a result, lasers used to launch light into such fibers are often offset some distance from the centerline of the multimode fiber to avoid this region of non-symmetric hole closure. Thus, both single mode and multimode fibers could benefit from lowered PMD.

One method used to reduce PMD is spinning of the optical fiber during the fiber draw operation, wherein the fiber is mechanically twisted along its centerline axis while being drawn from the molten root of the optical fiber preform or blank. This twisting enables orthogonal components of light to couple to each other, thus averaging their dispersion and lowering PMD. Although spinning can mitigate the effects of non-symmetric hole closure, spinning is a fairly complicated process which can detract from an optical fiber and/or the manufacture thereof. For example, spinning can impede the speed at which fiber is drawn, cause coating geometry perturbations, reduce the strength of the optical fiber, and so forth.

Additionally, asymmetric core geometry can cause variations in core diameter along the length of the fiber core so that light transmitted through the fiber propagates through or "sees" a different core cross-sectional area at different points along the length of the optical fiber. In addition, an asymmetric centerline profile can reduce the bandwidth of laser launched multimode fiber.

The use of strong vacuum forces to close the centerline aperture may also result in voids being formed along the centerline which can further impair the transmissive properties of the optical fiber.

As used herein, the term "preform" refers to any silica-based body used in the manufacture of optical waveguide fiber, whether containing silica soot or not, including but not limited to preforms also known as unconsolidated soot preforms, soot core preforms, soot core blanks, fused silica preforms, core rod preforms, core cane preforms, core blanks, glass core blanks, glass cane preforms, glassy preform, consolidated preform, and/or optical fiber preforms.

SUMMARY OF THE INVENTION

In one aspect, the present invention relates to a method of forming a preform for use in making an optical waveguide fiber. The method comprises providing a consolidated preform having an outer surface with an outside diameter and an inner surface with an inside diameter, the inner surface defining a centerline aperture therein, and exposing the inner surface to a first pressure, less than the pressure at the outer surface, while at least part of the preform is at a first temperature for a time sufficient to contract without fully collapsing the aperture and without pulling on the preform, i.e. with no mechanical pulling, or essentially no mechanical pulling, on the preform.

In one preferred embodiment, the entire preform is disposed within an isothermal oven. In another preferred embodiment, a majority of the preform is at the first temperature. In yet another preferred embodiment, the entire preform is at the first temperature.

In a preferred embodiment, the first temperature is less than the consolidation temperature of the preform. In another preferred embodiment, the first temperature is about equal to the consolidation temperature of the preform. In yet another preferred embodiment, the first temperature is between the consolidation temperature and the draw temperature of the preform.

In still another preferred embodiment, the entire preform is below its draw temperature.

In yet another preferred embodiment, the first temperature is about equal to the draw temperature of the preform.

Preferably, the first temperature is between about 1200° C. and about 2200° C., more preferably between about 1300° C. and about 2100° C. In a preferred embodiment, the first temperature is between about 1450° C. and about 1950° C. In another preferred embodiment, the first temperature is between about 1300° C. and about 1600° C. In yet another preferred embodiment, the first temperature is between about 1650° C. and about 2200° C. In still another preferred embodiment, the first temperature is between about 1750° C. and about 2100° C. In yet another preferred embodiment, the first temperature is between about 1900° C. and about 2000° C.

In one preferred embodiment, the first pressure is greater than about 133 Pa (1 Torr). In another preferred embodiment, the first pressure is less than about 1.33 kPa (10 Torr). In yet another preferred embodiment, the first pressure is less than about 13.3 kPa (100 Torr). In still another preferred embodiment, the first pressure is less than about 66.7 kPa (500 Torr). In yet another preferred embodiment, the first pressure is less than about 73.3 kPa (700 Torr).

Preferably, the centerline aperture is contracted or reduced in size in a first step, then further contracted or reduced in size in at least one other step. Preferably, the pressure in the centerline aperture in the first step is less than the pressure in the centerline aperture in the second or subsequent steps. In a preferred embodiment, the centerline aperture is fully collapsed in a second step. In another preferred embodiment, the centerline aperture is reduced in size in a first step, then further reduced in size in at least one intermediate step, then fully collapsed in a final aperture closing step.

Preferably, in the first step, the inner surface of the preform is at a first pressure, less than the pressure at the outer surface, while at least part of the preform is at the first temperature between about 1 minute and about 10 hours. For a preform of a given size and composition, and at a given internal pressure in the centerline aperture, or more particularly for a given pressure difference between the outer surface and the inner surface of the preform, lower temperatures require longer times to achieve similar reductions in the size of the aperture. Generally, the symmetry and/or circularity around the centerline region may be improved with longer treatment times, although treatment times may be limited by commercial delivery schedules, cost/benefit tradeoffs, and/or other factors.

The method may preferably comprise, after the aperture is contracted, exposing the inner surface to a second pressure, greater than the first pressure, while at least part of the preform is at a second temperature and for a time sufficient to further contract the aperture.

In a preferred embodiment, the second pressure is less than the pressure at the outer surface. In another preferred embodiment, the second pressure is about equal to the pressure at the outer surface. In yet another preferred embodiment, the second pressure is greater than the pressure at the outer surface. In still another preferred embodiment, the second pressure is only slightly greater than the pressure at the outer surface.

In a preferred embodiment, the second temperature is greater than the first temperature. In another preferred embodiment, the second temperature is about equal to the first temperature.

In a preferred embodiment, the aperture is fully collapsed after the second step. In another preferred embodiment, the aperture is fully collapsed after a plurality of steps of radially reducing the aperture without fully collapsing the aperture.

In a preferred embodiment, the preform is not pulled or not drawn or not redrawn while the inner surface is being exposed to the second pressure.

In another preferred embodiment, the preform is pulled while the inner surface is being exposed to the second pressure.

In a preferred embodiment, the second temperature is about equal to the consolidation temperature of the preform. In another preferred embodiment, the second temperature is between the consolidation temperature and the draw temperature of the preform. In yet another preferred embodiment, the second temperature is about equal to the draw temperature of the preform.

Preferably, the second temperature is between about 1200° C. and about 2200° C. In a preferred embodiment, the second temperature is between about 1300° C. and about 2100° C. In another preferred embodiment, the second temperature is between about 1450° C. and about 1950° C. In yet another preferred embodiment, the second temperature is between about 1300° C. and about 1600° C. In still another preferred embodiment, the second temperature is between about 1650° C. and about 2200° C. In yet another preferred embodiment, the second temperature is between about 1750° C. and about 2100° C. In still yet another preferred embodiment, the second temperature is between about 1900° C. and about 2000° C.

In a preferred embodiment, the second pressure is greater than 66.7 kPa (500 Torr). In another preferred embodiment, the second pressure is greater than 73.3 kPa (700 Torr). In yet another preferred embodiment, the second pressure is greater than 100 kPa (750 Torr). In still another preferred embodiment, the second pressure is greater than 101 kPa (760 Torr).

The method may preferably comprise, after the aperture is contracted, exposing the inner surface to a second pressure greater than the first pressure while at least part of the preform is at a second temperature and for a time sufficient to fully collapse the aperture.

The method may preferably comprise fully collapsing the aperture by drawing the preform into a reduced diameter preform or into an optical waveguide fiber while at least a portion of the preform is at or above the draw temperature of the preform.

In a preferred embodiment, the method comprises passively inducing the first pressure. In another preferred embodiment, the method comprises actively inducing the first pressure.

The method may preferably comprise controlling the pressure in the aperture. In a preferred embodiment, the pressure in the aperture is controlled by an open feedback loop. In another preferred embodiment, the pressure in the aperture is controlled by a closed feedback loop.

In one preferred embodiment, the pressure in the aperture is varied as a function of the diameter of the aperture. The method may preferably comprise measuring the diameter of the centerline aperture.

In a preferred embodiment, the pressure at the outer surface is greater than about 50.7 kPa (380 Torr). In another preferred embodiment, the pressure at the outer surface is greater than about 80 kPa (600 Torr). In yet another preferred embodiment, the pressure at the outer surface is greater than about 101 kPa (760 Torr). In still another preferred embodiment, the pressure at the outer surface is at or around atmospheric pressure.

In a preferred embodiment, the preform is fabricated via an OVD process.

The method may further preferably comprise drawing fiber from the preform, even more preferably after the centerline aperture has fully collapsed.

In another aspect, the present invention relates to a method of forming a preform for use in making an optical waveguide fiber, the method comprising providing a consolidated preform having an outer surface with an outside diameter and an inner surface with an inside diameter, the inner surface defining a centerline aperture therein, and exposing the inner surface to a first pressure, less than the pressure at the outer surface, while the preform is at a first temperature for a time sufficient to contract without fully collapsing the aperture and without pulling on the preform.

In a preferred embodiment, the entire preform is disposed within an isothermal oven.

Preferably, the first temperature is between about 1300° C. and about 1700° C., even more preferably the first temperature is between about 1400° C. and about 1600° C.

In a preferred embodiment, the first pressure is greater than about 133 Pa (1 Torr). In another preferred embodiment, the first pressure is less than about 1.33 kPa (10 Torr). In yet another preferred embodiment, the first pressure is less than about 13.3 kPa (100 Torr).

The method may preferably comprise drawing the preform into a reduced diameter preform or into an optical waveguide fiber while at least a portion of the preform is at or above the draw temperature of the preform.

In a preferred embodiment, the aperture is fully collapsed at draw (or at redraw), that is, upon the preform being mechanically pulled while at least a portion of the preform is at or above a draw temperature.

In a preferred embodiment, the pressure in the aperture at draw is greater than the first pressure. In another preferred embodiment, the pressure in the aperture at draw is about equal to the pressure at the outer surface. In yet another preferred embodiment, the pressure in the aperture at draw is greater than about 73.3 kPa (700 Torr). In still another preferred embodiment, the pressure in the aperture at draw is greater than about 100 kPa (750 Torr). In still yet another preferred embodiment, the pressure in the aperture at draw is greater than about 101 kPa (760 Torr). In another preferred embodiment, the pressure in the aperture at draw is about 101 kPa (760 Torr).

Single mode fibers may be made in accordance with the present invention which exhibit low polarization mode dispersion without having to resort to or rely solely upon spinning or other PMD mitigation methods. Preferably, the amount of spin imparted to the optical fiber which is required for achieving a desired level of PMD is reduced. Even more preferably, spinning of the fiber is eliminated.

The method of the present invention can also be used to form multimode optical fibers which are inherently better suited for use with laser sources. In laser light launching methods, the spot size of the laser can be small relative to the overall size of the core. If the laser is directed at an area having non-symmetric glass layers, these non-symmetric glass layers can disturb the path along which the laser beam would otherwise travel. The present invention preferably enhances the concentricity of these layers. Furthermore, the present invention preferably aids in achieving uniformly symmetric and concentric glass layers about the centerline of the core of the fiber.

Moreover, an optical fiber produced in accordance with the present invention may have less voids along its centerline and/or proximate its centerline. It is believed that the effects of the controlled contraction of the hole diameter due to the varying schedule of centerline aperture pressurization at, near or below ambient pressure can help to reduce the likelihood of voids in the fiber, thereby reducing the light reflections and/or losses associated therewith.

These and other aspects of the invention will be further understood and appreciated by those skilled in the art by reference to the following written specification, claims, and appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of the specification. The drawings illustrate various embodiments of the invention, and together with the description serve to explain the principals and operation of the invention.

BRIEF DESCRIPTION OF THE DRAWINGS

FIG. 2 is a fragmentary perspective view of an optical waveguide fiber;

FIG. 3 is a fragmentary perspective view of a glass optical fiber preform;

FIG. 7 is a vertical cross-sectional schematic view of a consolidated preform having a centerline aperture about to enter into proximity with a hot zone of a furnace;

FIG. 8 is a vertical cross-sectional schematic view of a consolidated preform having a centerline aperture being contracted by evacuation thereof;

DETAILED DESCRIPTION OF THE PREFERRED EMBODIMENT

Figure 1:
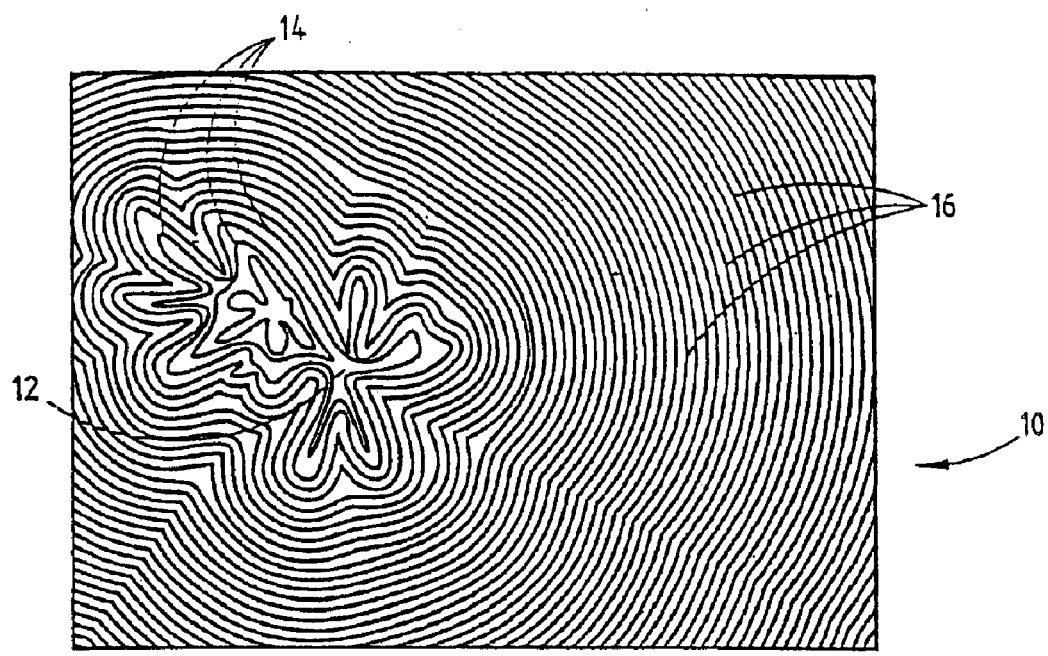
FIG. 1 is an exemplary schematic view of a FIG. 1 is an exemplary schematic view of a centerline profile of a cross section of a generally cylindrical glassy body, such as a preform or an optical fiber, formed using a strong vacuum force to collapse the centerline aperture.

Reference will now be made in detail to the present preferred embodiments of the invention, examples of which are illustrated in the accompanying drawings. Wherever possible, the same reference numerals will be used throughout the drawings to refer to the same or like parts. For clarity of illustration and simplicity, elements shown in the figures have not necessarily been drawn to scale.

The effective area is generally defined as, $$A_{eff} = 2\pi (\int E^2 r\, dr)^2 / (\int E^4 r\, dr)$$

wherein the integration limits are zero to $\infty$, and E is the electric field associated with the propagated light.

The mode field diameter, $D_{mf}$ is measured using the Peterman II method wherein, $2w = D_{mf}$ and $w^2 = (2\int E^2\, r\, dr / \int [dE/dr]^2\, r\, dr)$, the intergral limits being 0 to $\infty$.

The relative index or relative refractive index of a segment, $\Delta$ %, as used herein, is defined by the equation, $$\Delta\% = 100 \times (n_i^2 - n_c^2)/2n_c^2$$

where $n_i$ is the maximum refractive index of the index profile segment denoted as i, and $n_c$, the reference refractive index, is taken to be the minimum index of the clad layer. Every point in the segment has an associated relative index. The term refractive index profile or index profile is the relation between $\Delta$ % or refractive index and radius over a selected segment of the core.

As used herein, "fully collapsed" refers to complete contraction of the centerline aperture, or complete contraction of the inner surface of the preform, wherein the centerline region of the preform is solid.

Referring initially to FIG. 2, an optical waveguide fiber 30 manufactured by the method of the present invention is shown. The optical waveguide fiber includes a central core region 32 having a centrally located axis 33, an optional outer glass core region 34 and a coaxial cladding region 36. Optical waveguide fiber 30 is formed from silica-based preform 100 in the form of a cylindrical glass body or optical fiber preform 70 (FIG. 3) having a central core region 42 with a longitudinally extending, centrally located centerline aperture 60 extending there through along a central longitudinal axis 45. Optical fiber preform 70 also includes an outer glass core region 46 and cladding region 48 both coaxial with core region 42. For example, central core region 32 and 42 could consist of germanium doped central region, and region 34 and 46 could consist of additional regions having various amounts of fluorine and/or germania dopants, to form a complex index of refraction profile (e.g., a segcor profile). Of course, the invention is not limited to use with these dopants, nor is it limited to fibers having complex index of refraction profiles. Instead, region 34 may be omitted, and the fiber may be a simple step index profile. Also, region 34 could include a so-called near clad region, which typically consists of pure silica.

In accordance with one preferred embodiment of the invention, silica-based preform 100 in the form of soot core blank, or soot preform 58 comprised at least partially of silica-based soot (FIG. 4), and which is subsequently processed into a cylindrical glass preform 70 is preferably formed by chemically reacting at least some of the constituents of a moving fluid mixture including at least one glass-forming precursor compound in an oxidizing medium to form a silica-based reaction product. At least a portion of this reaction product is directed toward a substrate, to form a porous body. The reference numeral 100 is used herein and in the drawings to designate a silica-based preform whether the preform includes soot, consolidated glass, or a combination thereof.

Figure 4:
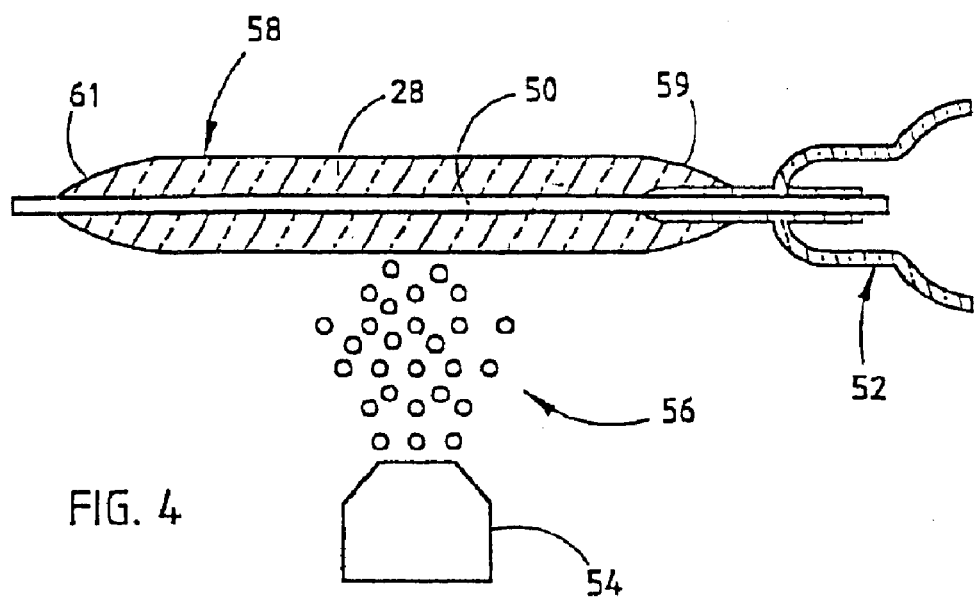
FIG. 4 is a schematic view illustrating an outside vapor deposition process for making a soot core blank or a soot blank.

The porous body may be formed, for example, by depositing layers of soot onto a bait rod via an outside vapor deposition ("OVD") process. Such an OVD process is illustrated in FIG. 4. In FIG. 4, a bait rod or mandrel 50 is inserted through a tubular integral handle 52 and mounted on a lathe (not shown). The lathe is designed to rotate and translate mandrel 50 in close proximity with a soot-generating burner 54. As mandrel 50 is rotated and translated, silica-based reaction product 56, known generally as soot, is directed toward mandrel 50. The silica-based reaction product 56 can include pure silica and/or dopants. At least a portion of silica-based reaction product 56 is deposited on mandrel 50 and on a portion of integral handle 52 to form a silica-based preform 100 in the form of a cylindrical soot porous body or soot core blank 58 thereon having a proximal end 59 and a distal end 61. While this aspect of the present invention has been described in conjunction with a translating lathe, the skilled artisan will understand that soot-generating burner 54 can translate rather than the mandrel 50. Moreover, the present invention is not limited to soot deposition via an OVD process. Rather, other methods of chemically reacting at least some of the constitutes of a moving fluid mixture, such as, but not limited to, liquid or vapor phase delivery of at least one glass-forming precursor compound in an oxidizing medium can be used to form the silica-based reaction product of the present invention. Moreover, other processes, such as the inside vapor deposition process (IV), and modified chemical vapor deposition process (MCVD) are also applicable to the present invention. The present invention is most suitable for preparing to close, partially closing, and/or fully collapsing a centerline aperture.

Figure 5:
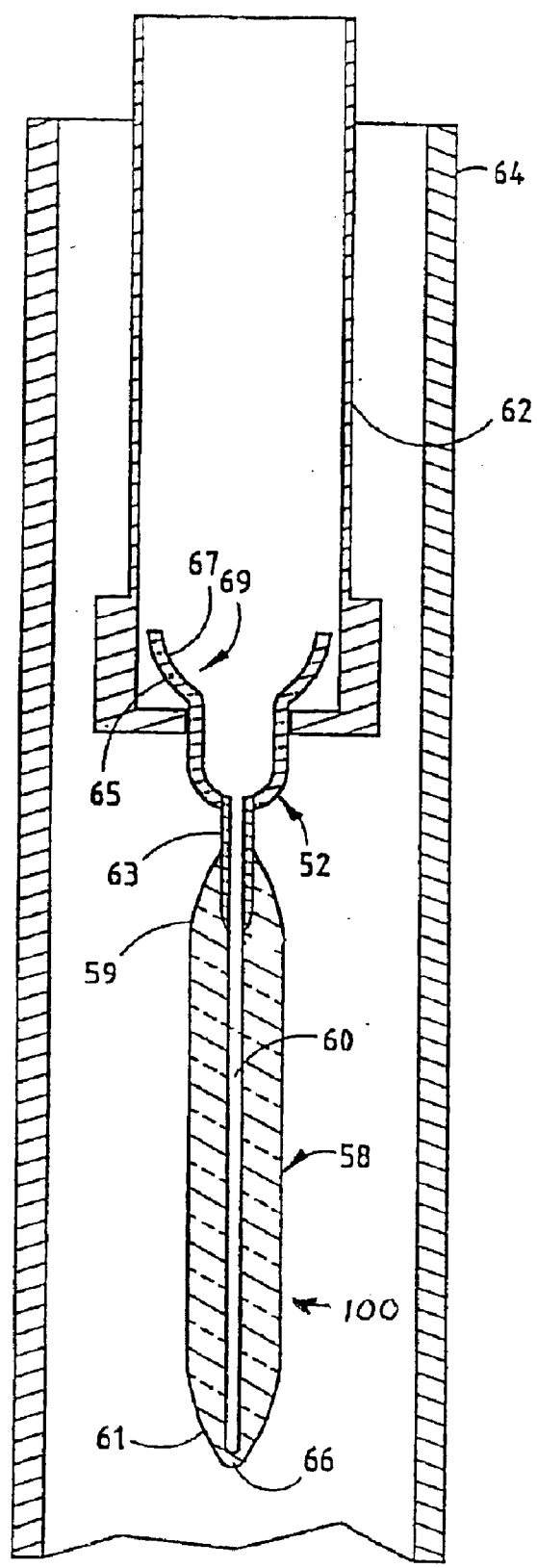
FIG. 5 is a vertical cross-sectional schematic view of a soot core blank located within a consolidation furnace.

Once the desired quantity of soot has been deposited on mandrel 50, soot deposition is terminated and mandrel 50 is removed from soot core blank 58. Upon removal of mandrel 50, soot core blank 58 defines an axially extending void or centerline aperture 60 (FIG. 5). Soot core blank 58 is vertically suspended within a consolidation furnace 64 by a downfeed handle 62 which engages integral handle 52. Consolidation furnace 64 preferable concentrically surrounds the soot core blank 58. Integral handle 52 is preferably formed of a silica based glass material and includes a first end 63 about which proximal end 59 of core blank 58 is formed, and a second end 65 defining an inner surface 67 therein. Alternatively, second end 65 of integral handle 52 may be flame worked thereon subsequent to the deposition and consolidation steps. Integral handle 52 is generally cup-shaped and defines an interior cavity 69. Inner surface 67 is preferably provided with a coarse texture, the significance of which is discussed below. Centerline aperture 60 located near distal end 61 of soot core blank 58 is preferably fitted with a glass bottom plug 66 prior to positioning porous body 58 within consolidation furnace 64A. Glass plug 66 is preferably made from a relatively low melting point glass (e.g. lower than that of the soot core blank) so that during consolidation, as the soot of the soot core blank is consolidated into glass, the glass plug will effectively seal the end of the centerline aperture. While inserting bottom plug 66 is the preferable method for sealing the distal end 61 of porous body 58, other methods and devices sufficient to seal or close distal end 61 to prohibit gas flow therethrough may be employed such as, but not limited to, flaming and/or crimping the end 61 shut.

In one aspect of the present invention, the centerline aperture 60 at proximal end 59 of core blank 58 may remain open or may be closed by inserting a top plug into centerline aperture 60 prior to the consolidation step, and the top plug may be similar to bottom plug 66. In one preferred embodiment, to facilitate such plugging of the hole, the hole inside the integral handle is made larger than the hole inside the soot preform 58, and the size of plug 73 is selected to be intermediate these two internal diameters, so that the plug can be inserted through the integral handle portion 52, but gets stuck in the centerline aperture region of preform 58. In another preferred embodiment, top plug 73 may consist of a thicker region (thick enough to plug the centerline aperture 60 within the soot preform 58) at a bottom end which serves to plug the centerline aperture 60 of soot preform 58, another thick region (thicker than the centerline aperture in integral handle 52) at the top end of the plug to prevent the plug 73 from falling into the centerline aperture 60 of soot preform 58, and an intermediate region between the two ends to connect these two thicker end regions. Thus the soot preform 58 may be consolidated while both ends of the centerline aperture are sealed, yielding a consolidated glassy preform 55 which may be immediately or subsequently processed.

In one aspect of the present invention, the silica-based preform 100 in the form of a soot core blank, or porous body, or soot preform 58 is preferably chemically dried, for example, by exposing soot core blank 58 to a chlorine containing atmosphere at an elevated temperature within consolidation furnace 64. The chlorine containing atmosphere effectively removes water and other impurities from soot core blank 58, which otherwise would have an undesirable effect on the properties of optical waveguide fiber manufactured from blank 58. In an OVD formed soot core blank 58, the chlorine flows sufficiently through the soot to effectively dry the entire blank 58, including the region surrounding centerline aperture 60. Following the chemical drying step, the temperature of the furnace is elevated to a temperature sufficient to consolidate the soot into a consolidated preform, or glassy preform, or glass core blank 55.

In a preferred embodiment, the soot preform 58 traverses through a consolidation oven or furnace 64. The consolidation furnace 64 may have one or more heat zones. Thus, for example, the soot preform 58 may preferably be vertically lowered into consolidation furnace 64, wherein one end or tip of the soot preform 58 encounters a heat zone. As a portion of the soot preform 58 becomes heated, at least part of soot preform reaches a consolidation temperature. Alternatively, the entire heated portion of the soot preform 58 may reach a consolidation temperature therethroughout.

Typically, consolidation temperatures for a silica-based soot preform typically lie in the range of 1400° C. to 1600° C., or 1400° C. to 1500° C., and at least one embodiment of a soot preform consolidates at around 1450° C., although the skilled artisan could readily determine the temperature(s) applicable to a soot preform of a particular composition.

In a preferred embodiment, the silica-based preform 100 in the form of soot preform 58 traverses at a desired rate, and/or the soot preform or a portion thereof is exposed to a temperature and for a time sufficient to consolidate at least part of the soot preform. Thus, the soot preform 58, or a fraction thereof, can be consolidated into a glassy preform or consolidated preform 55.

In another preferred embodiment, the soot preform 58 (or a selected fraction thereof) may be placed in a consolidation furnace such that the entire soot preform, or the selected fraction thereof, is in its entirety, exposed to the heating effect of the consolidation furnace 64 at the same time, or more particularly, the entire preform or selected fraction thereof is simultaneously exposed to the heating effect of the hot zone or zones of the consolidation furnace. Thus, the entire soot preform 58 (or a selected fraction thereof) can be consolidated en masse into a glassy preform or consolidated preform 55.

As used herein, the "entire" preform refers to the useable portion of the preform, which typically would not include, for example the so-called handle or plug glassware that may be fused to the silica blank for handling and/or other purposes. The usable portion of a preform is that part of the preform which is capable of being subsequently drawn into optical waveguide fiber. Furthermore, the user may choose, or equipment may dictate, that only a part of the preform is processed according to the present invention. For example, a preform may be lowered into a furnace or oven from above, and the handle and top portion of the soot or consolidated glass (which may be capable of being subsequently drawn into optical fiber) remains above the hot zone inside the furnace.

Figure 6:
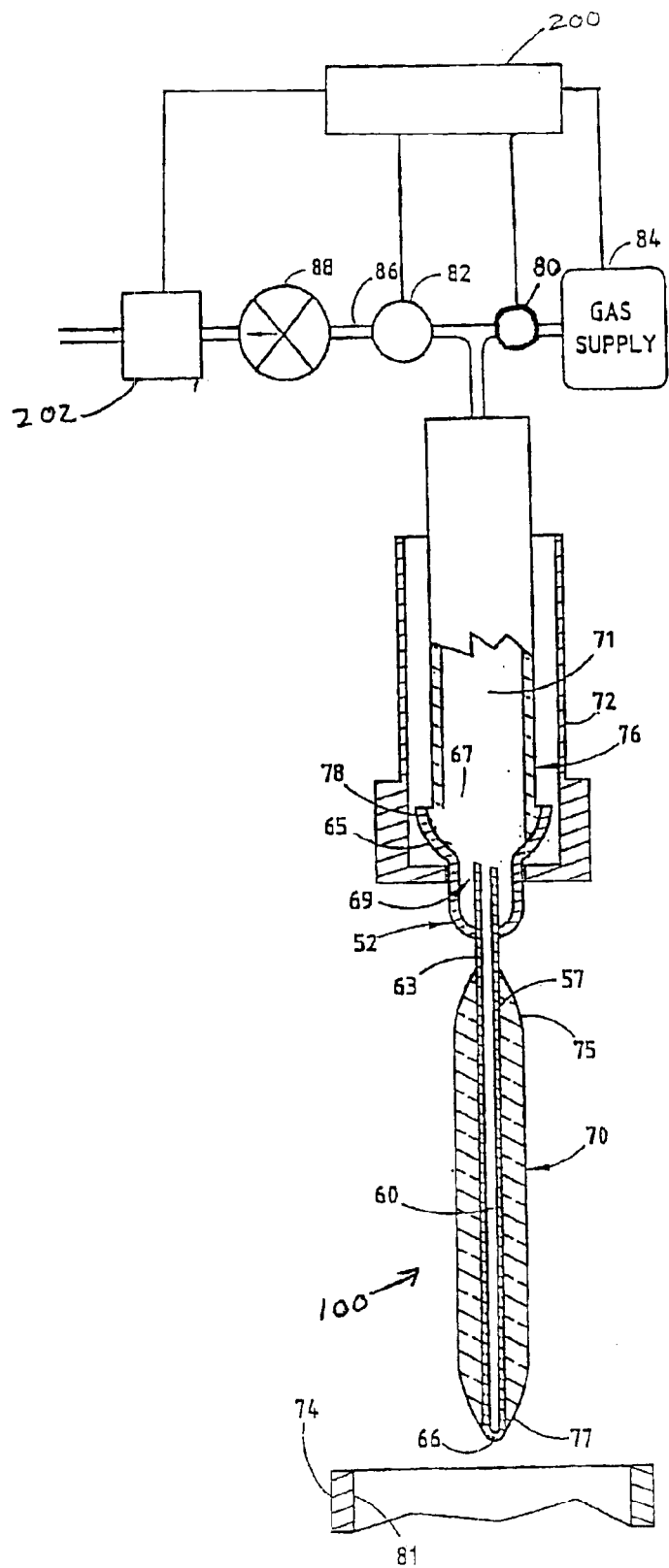
FIG. 6 is a vertical cross-sectional schematic view of a preform with apparatus for both injecting gas(es) into and evacuating gas(es) out of the centerline aperture.

As seen in FIG. 6, in one preferred embodiment a cylindrical inner handle 76 has a lower end bowl-shaped, coarse textured mating surface 78 which forms a substantially airtight seal with mating surface 67 of integral handle 52. Negative pressure may be applied to interior cavity 71 of inner handle 76 and interior cavity 69 of integral handle 52. Applying a vacuum, or negative pressure, can assist in removing contaminants such as $H_2O$ as well as other particulate matter therefrom. A dry inert (e.g. helium) or drying (e.g. chlorine) gas or gases from at least one gas supply 84 may be dispersed into the centerline aperture 60, interior cavity 71, and interior cavity 69. The supply of dry or drying gases is preferably provided so that if any gas enters centerline aperture 60 of glass preform 100, the gas is a clean dry gas, or a clean gas that promotes drying, that will not lead to attenuation induced losses within the resultant optical waveguide fiber. The gas supply 84 may include a pressurized gas source and/or a pump for delivering the pressurizing gas(es). Valve 80 may preferably provide on/off control of the flow of gases to and/or from gas supply 84.

Controller 200 may be provided to control gas supply 84, which may include a gas pump and/or a pressurized gas source, with an open loop control scheme or a closed loop feedback control scheme based upon one or more feedback signals of one or more appropriate control variables, e.g. a pressure signal from a pressure sensor located in a position to sense an appropriate pressure such as the centerline aperture 60, and/or one or more of the lines between gas supply 84, valve 80, and inner handle 76. Sensors are not shown in the drawings.

One or more dry or drying gas(es) may then be introduced within inner handle 76 thereby maintaining interior cavity 71 of inner handle 76, interior cavity 69 of integral handle 52, and centerline aperture 60 of glass preform 70 free of contaminants and from being recontaminated. A valve 82 may be used to control the flow of gas from the gas supply 84 as well as the flow of gas to and from centerline aperture 60, interior cavity 71, and interior cavity 69. Exhaust tube 86 may be connected to or coupled with a one-way valve 88 that prevents the entry of air into exhaust tube 86 which might otherwise result in the contamination of centerline aperture 60 by ambient air and contaminant matter associated therewith. One-way valve 88 may be provided in the form of a bubbler, a check valve, or any other form of a one-way valve that prevents the backflow of ambient air into exhaust tube 86. Exhaust tube 86 may further be connected to vacuum pump 202 which is preferably provided to evacuate the centerline aperture 60. Valve 82 and/or vacuum pump 202 may be controlled by controller 200, either by an open loop control scheme or closed feedback loop control scheme. Sensors and their connections between valve 82 and/or vacuum pump 202 are not shown in the drawings.

In accordance with a preferred embodiment of the present invention, the centerline aperture 60 is evacuated to reduce the pressure therein to a first pressure, or first pressure range, or first vacuum level. The pressure in the centerline aperture 60 is reduced to a first pressure which is negative with respect to the pressure at the outer surface of the preform 100, and for a time, sufficient to only partially close or contract the inside diameter of the preform 100 wherever the preform is at a first temperature sufficient to radially close the centerline aperture 60 thereat. Thus, if at least part of the preform 100 is greater than or equal to the first temperture, then at least part of the centerline aperture 60 would radially partially contract with sufficient time and vacuum level. The outside diameter of the preform 58 would also typically contract in proximity to wherever the inside diameter contracts.

After the centerline aperture 60 has been partially closed or partially contracted, the pressure in the centerline aperture is increased, or allowed to increase, to a second pressure level higher than the first pressure or first vacuum level. Preferably, the second pressure in the centerline aperture 60 is less than, equal to, or slightly greater than the ambient pressure at the outside surface of the preform. Furthermore, the preform, or at least part of the preform, is at a second temperature preferably at or above the first temperature.

In a preferred embodiment, the application of vacuum to the centerline aperture 60 is controlled. For example, gas evacuation flow rates, pressures, durations, and/or schedules may be regulated, either via closed loop feedback or open loop control schemes.

Preform 100 may comprise silica-based soot, consolidated glass, or a combination thereof. In a preferred embodiment preform 100 comprises consolidated glass.

Preform 100 may be of silica-based soot, or substantially comprised of silica-based soot. Preform 100 may also preferably comprise previously consolidated glass. In a preferred embodiment, the preform 100 comprises a glass tube 48.

Thus, whether a particular transverse cross-section of the preform 100 contains silica soot, previously consolidated glass, or a combination thereof, the temperature of that portion of the preform must be sufficiently high wherein that part of the preform is soft enough to enable the centerline aperture 60 in that region to contract under the influence of the applied vacuum.

If the part of the preform 100 where it is desired to contract or close the centerline aperture 60 region is not high enough in temperature, the portion of the preform around that part of the preform must be heated. On the other hand, if that portion of the preform 100 has already been heated, and the temperature of that part of the preform is sufficiently high wherein that part of the preform is soft enough to enable the centerline aperture 60 in that region to contract under the influence of the pressurizing gas(es), then no additional heating is necessary in that portion.

At least part of the preform 100 is preferably consolidated while at least a portion of the preform is heated. At least a portion of the preform 100 may preferably be heated while the centerline aperture 60 is being evacuated. On the other hand, at least a portion of the preform 58 might not need to be heated while the centerline aperture is being evacuated.

If the preform 100 is being traversed through a hot zone in a furnace which substantially locally heats a portion of the preform, then the remainder of the preform might not be so heated. Alternately, the furnace may be provided with additional hot zones such that the preform 58 can be advanced into the furnace sufficiently to be in proximity to the one or more additional hot zones.

As used herein, a plurality of hot zones or heated zones may also correspond to a plurality of furnaces, whether arranged adjacent to, or in proximity to, each other such that a single preform may be heated by the plurality of furnaces.

In a preferred embodiment, the entire preform 100 is disposed in an isothermal furnace or isothermal hot zone(s) large enough to heat the preform, or a desired portion thereof, generally uniformly.

FIG. 7 schematically illustrates a silica-based preform 100 having a centerline aperture 60 before entering a hot zone within a furnace 64. The hot zone may be the first hot zone or the only hot zone in a particular furnace. The hot zone typically occurs at or near a heating element or elements 90 in the furnace or oven. The preform 100 is preferably a previously consolidated glass preform 55 which may have been consolidated in the same furnace or a different furnace, and/or at an earlier time. On the other hand, the preform 100 may be a soot preform 58, or a preform 58 which comprises both consolidated glass and silica-based soot, wherein it is desired to completely consolidate at least a portion of the preform during its traverse through the hot zone, as illustrated in FIG. 7. Thus, before entering the hot zone illustrated in FIG. 7, the silica-based preform 100, or the end of the preform about to enter the hot zone, may be at a temperature below its consolidation temperature. For example, the silica-based preform 100 may have been consolidated then allowed to cool, say, to room temperature. On the other hand, the temperature of the silica-based preform 100, or the end of the preform, may be at or above its consolidation temperature. For example, the preform 100, or glassy preform 55, may have just been consolidated in the same furnace or a different furnace.

Before, and/or during, and/or after the preform 100 enters the hot zone, a first vacuum level is applied to the centerline aperture region of the preform 100, as indicated by arrow 101 in FIG. 7 showing the path of gases evacuated from the centerline aperture region, to reduce the pressure therein to a reduced pressure with respect to the pressure at the outer surface of the preform, and in particular with respect to the pressure at the portion of the outer surface of the preform proximate the hot zone.

FIG. 8 schematically shows the centerline aperture 60 of the preform 100 being closed or contracted. A vacuum is preferably maintained as the preform 100 proceeds through the hot zone, thereby causing the inner surface (and inside diameter) of the preform to contract, but not completely collapse upon itself. The outer surface (and outside diameter) of the preform contracts as well.

FIG. 8 also shows a preferred embodiment of a portion of a closed loop feedback control system comprising an aperture size measurement device 210, such as a camera, or a laser with an array of charge coupled devices (CCD), positioned in proximity to the preform 100 for measuring an inside dimension of the preform which defines the aperture 60, such as the inner diameter or radius. The measurement device 210 may be stationary with respect to the furnace, wherein the preform 100 may move or may be movable with respect to the furnace, wherein the preform 100 may also be at least temporarily stationary with respect to the furnace (e.g. for isothermal heating or controlled zone heating of the preform). Alternatively, the measurement device 210 may move with respect to the furnace. The output of the measurement device 210 is preferably routed to a controller 200 having data acquisition capability, wherein the controller 200 regulates the vacuum pump 202 according to a desired control scheme, as illustrated in FIG. 6. For example, the measured value of the inner radius may be correlated to a desired value for $\Delta p$, which serves as input to the control of the vacuum pump 202.

Figure 9:
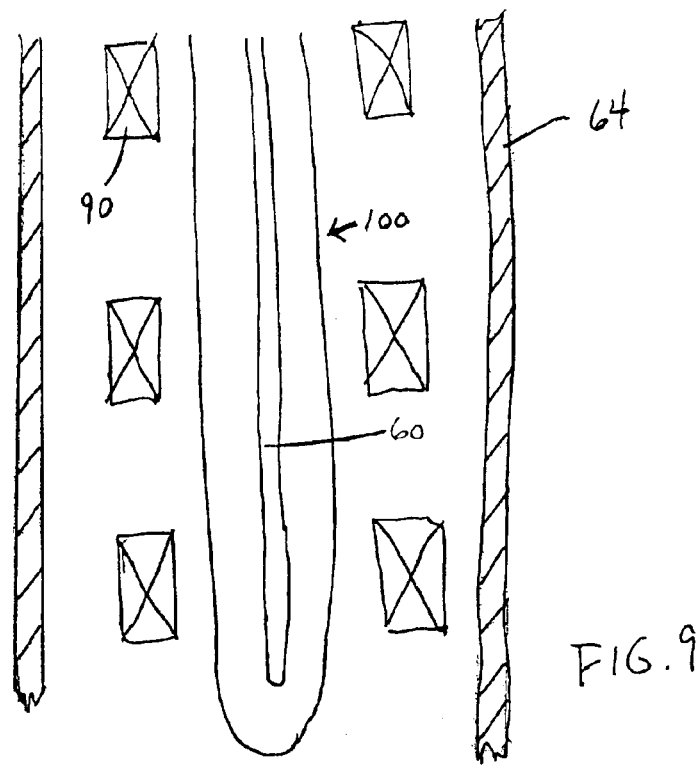
FIG. 9 is a vertical cross-sectional schematic view of a consolidated preform having a contracted centerline aperture which is in proximity to a plurality of heat zones in the furnace.

FIG. 9 schematically shows a furnace 64 having a plurality of hot zones, wherein the centerline aperture region of substantially all of the preform 100 has closed or contracted, but not fully. A plurality of hot zones may be desirable, or necessary, in order to raise or maintain the temperature of the portion, or portions, of interest in the preform. The skilled artisan will recognize that factors such as the traverse rate of the preform, the dimensions and composition of the preform, the heat energy available from a hot zone, including the heat exchange with the surrounding environment within the furnace, may all contribute to the determination of either the desirability or the necessity of having more than one hot zone.

After the centerline aperture 60 has contracted without having fully collapsed, the pressure in the partially closed centerline aperture of the preferably fully consolidated preform is then increased, or allowed to increase, to a pressure level that is higher than the first vacuum level and which is less than, or equal to, or slightly greater than the ambient pressure at the outside surface of the preform or the portion of the preform of interest.

In a preferred embodiment, the preform 100 is fully consolidated and has a partially closed centerline aperture, and can then be further processed, either into an optical fiber perform 70 or, eventually, into optical fiber 30. Additionally, the preform 100 may either be immediately further processed or stored for future processing.

The preform 100 may, at some point, undergo the addition of one or more silica-based layers. Thus, one or more additional soot layers may be laid on the preform, such that the preform may be subjected to one or more additional consolidation steps. In addition, or in the alternative, the consolidated preform may be placed inside a glass tube, which may or may not then be provided with one or more additional layers of silica-based layers.

The centerline aperture 60 is preferably fully closed or fully collapsed prior to, or during, redrawing of the preform 10 into a reduced-diameter preform or the drawing of the preform 100 into optical fiber. Full collapse of the centerline aperture 60 may be advantageously assisted by evacuating the centerline aperture. A vacuum can be advantageously applied when the preform, or a portion thereof, is sufficiently soft to allow the centerline region of the preform to collapse upon itself.

In accordance with the present invention, the deleterious effects of fully closing the centerline aperture 60 with the assistance of a single application of a relatively strong vacuum can be mitigated with a preform whose centerline aperture 60 has undergone at least two separate reductions in size to arrive at a fully collapsed condition. In a preferred embodiment, the first reduction in hole size occurs after consolidation and before draw or redraw.

If the preform 100 has a sufficiently small nominal inside diameter and if the preform is raised to a high enough temperature, the centerline region of the preform may finally fully collapse upon itself without the assistance of vacuum, and/or without the assistance of pulling or drawing upon one or more ends of the preform. Full collapse of the centerline aperture may be achieved by raising or maintaining the temperature of the relevant part of the preform (or the entire preform) to a relatively higher temperature and allowing the pressure in the hole to equalize with the ambient pressure at the outer surface of the preform. Thus, after the centerline aperture is partially closed under application of a vacuum, the hole may then be fully closed at or near ambient pressure. The pressure at the centerline may even be slightly greater than the ambient pressure (i.e. inside the furnace and around the preform or portion of interest of the preform) to enable full collapse of the centerline aperture if the surface tension effects predominate.

On the other hand, if the nominal inner diameter is relatively large, the application of a vacuum to the centerline aperture, and/or the application of a pulling force on one or more ends of the preform may be desirable (e.g. to increase the speed of hole closure) or may even be necessary to close the hole. For example, the centerline aperture 60 of a preform 100 in the form of a core cane preform 55 of typical dimensions may possibly not fully close without the assistance of vacuum. Even a slight vacuum pulled on the centerline aperture region may be sufficient to complete the collapse. The deleterious effects of solely applying a vacuum to directly close a centerline aperture can thus be mitigated according the present invention by first reducing the size of the centerline aperture region with a first reduced pressure, followed by collapsing the centerline aperture at a higher pressure relative to the first reduced pressure, wherein the higher pressure is less than or equal to ambient pressure.

Thus, according to the present invention, the mean hole size or effective diameter of the centerline aperture is reduced, but not fully, and then in at least one additional step, the centerline aperture is exposed to a relatively higher pressure, i.e. preferably a lower strength vacuum or ambient pressure or near ambient pressure, for a time and at a temperature which results in full collapse of the centerline aperture, thereby increasing the symmetry of the centermost region of the preform, and/or increasing the circularity of the hole, and/or increasing the circularity or concentricity of the preform, and/or reducing the geometric perturbations of the preform, and in particular, its centermost region. Furthermore, the present invention may be applied to partially closing the centerline aperture in two or more steps which does not result in full collapse of the hole; the centerline aperture region of the silica-based body would have an improved circularity, and/or symmetry yet still possess a centerline aperture, wherein the body could then be further processed in another manner.

In general, higher temperatures are more preferable during the at least one additional step. Furthermore, the absence of an applied vacuum during the at least one additional step may result in better circularity or symmetry, but the application of vacuum may be preferable or even necessary from the standpoint of process speed considerations. On the other hand, a time penalty with respect to an increased time to close the centerline aperture might be desirable or even necessary to achieve a desired centerline region symmetry or circularity or a desired level of PMD.

Figure 10:
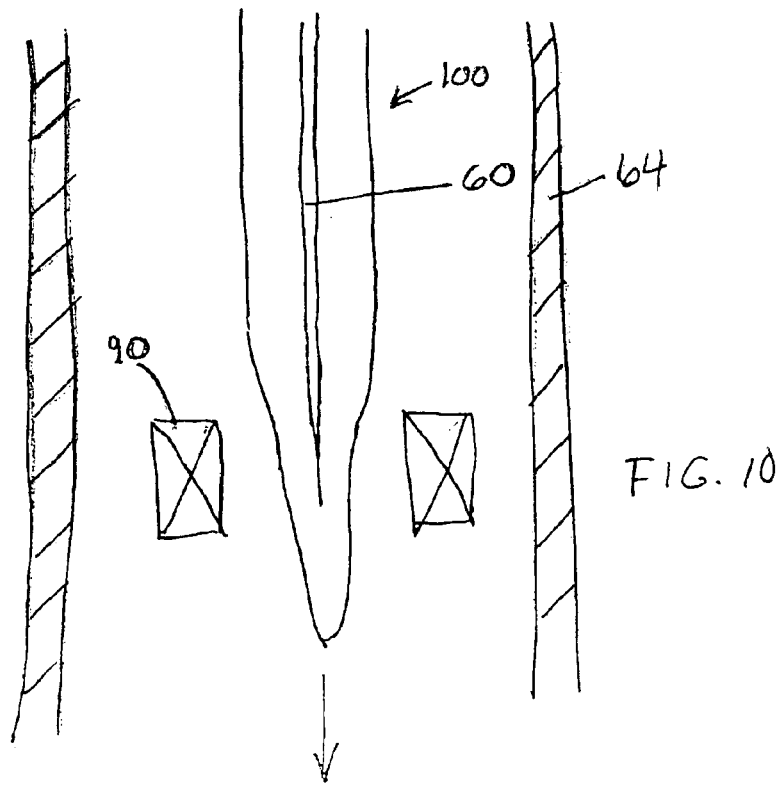
FIG. 10 is a vertical cross-sectional schematic view of a consolidated preform with a contracted centerline aperture which is being collapsed in proximity to a heat zone in the furnace.
Figure 11:
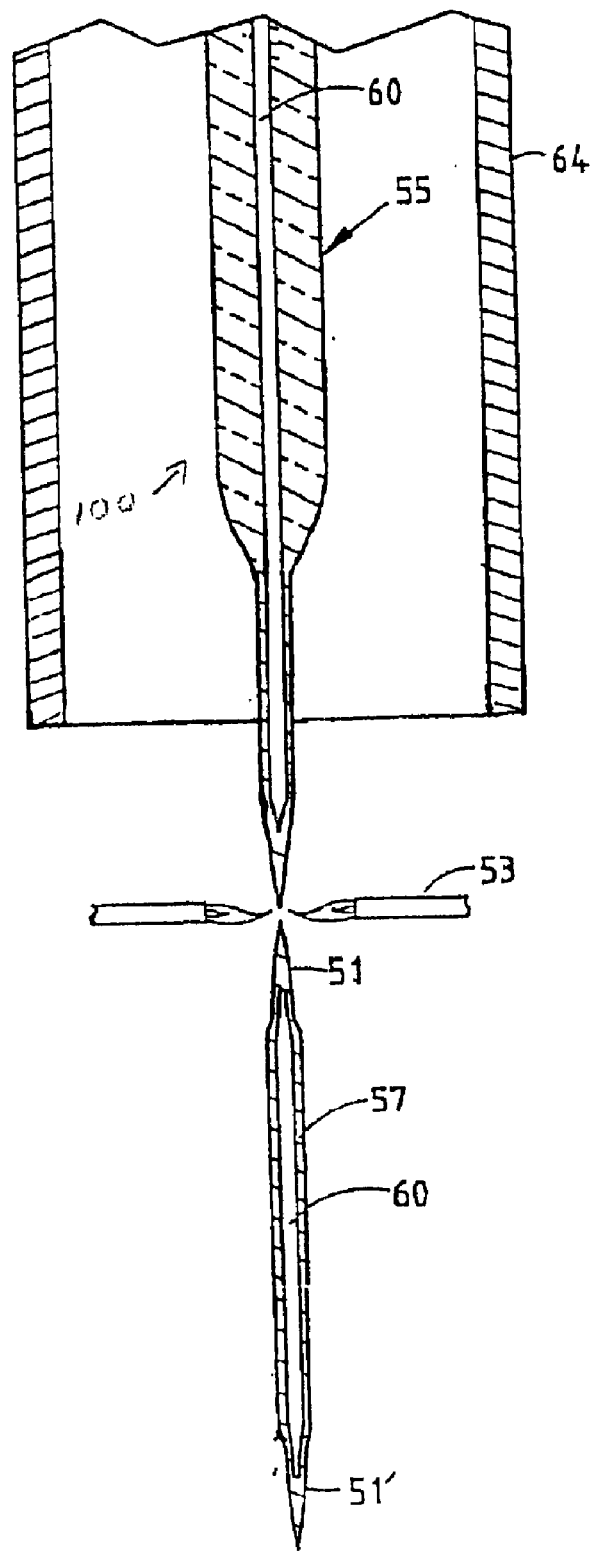
FIG. 11 is a vertical cross-sectional schematic view of a core cane being cut from a consolidated preform or glass core blank, the core cane having a centerline aperture.

FIG. 10 schematically represents a silica-based preform 100 in the form of a consolidated preform 55 having a previously contracted centerline aperture 60. The preform 55 is brought into proximity with a hot zone or heated section of a furnace. A vacuum may be applied to the centerline aperture 60 before and/or during the traverse of the preform 55 past the hot zone in order to assist in the full closing or full collapse of the centerline aperture. Thus, for example, the preform 55 represented in FIG. 10 may be a core cane preform with a centerline aperture 60 being formed into a core cane (without a centerline aperture). Moreover, one or more ends of the preform 55 may be pulled to draw the preform and assist in the collapse of the centerline aperture 60. The drawing action may be provided in addition to, or in lieu of, evacuating the centerline aperture 60.

The magnitude of the vacuum level(s) and the temperature of the preform, among other factors, govern the rate at which the centerline aperture region shrinks and circularizes. Increasing the temperature of the preform can reduce the time needed to reach a desired hole size, and/or circularity or symmetry. Furthermore, for given vacuum strength(s) and temperature(s), the time required to achieve a desired hole size, and/or circularity or symmetry, depends upon the initial non-circularity or non-symmetry of the centerline aperture region.

In a preferred embodiment, the first step and at least one additional step which includes, for example, a second evacuation or an increase in pressure to around ambient pressure, are performed on the preform 100 while the preform is disposed in the same furnace.

In another embodiment, the first step may occur in one location, e.g. at the consolidation furnace, and further hole closure and/or full collapse may occur in a second location, e.g. in holding oven or a redraw furnace. Thus, a preform 70 with a centerline aperture 60 may be introduced into a redraw furnace. Axial pulling on the preform during redraw can preferably provide a means for controlling diameter. Thereafter, the consolidated, redrawn core cane 57 can be introduced into the same redraw furnace a second time, or the core cane can be introduced into a second redraw furnace, during which time a vacuum could be applied to the centerline aperture, thereby closing the centerline aperture via vacuum and pulling.

While several variations to the method disclosed herein have been described, the specific embodiments are not intended to be limiting, but merely exemplary of the sequential steps possible.

Figure 12:
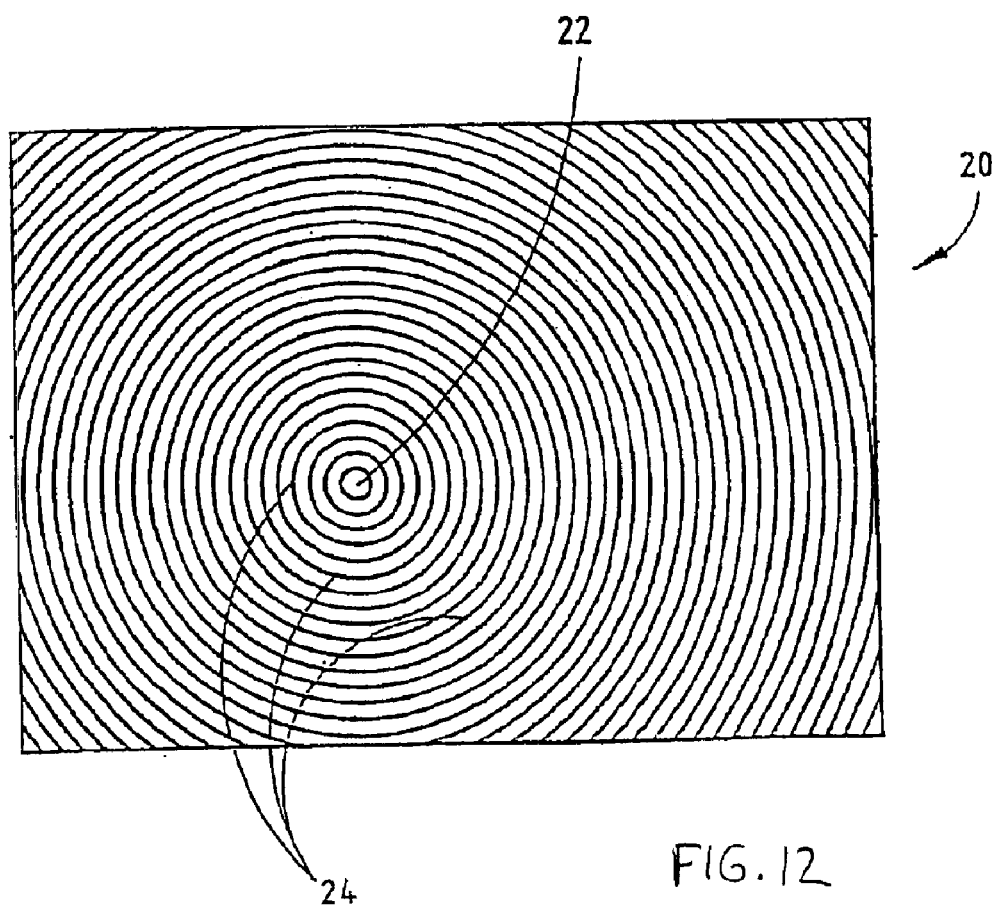
FIG. 12 is a schematic view of a substantially symmetric centerline profile of a cross section of an optical waveguide fiber made in accordance with the present invention.

FIG. 12 schematically illustrates a cross-section of a center region of an optical fiber preform or an optical fiber, indicated generally at 20, which includes a center point 22 surrounded by symmetrically shaped layers of glass 24. This symmetric centerline profile decreases polarization mode dispersion in single mode fibers and greatly facilitates the ability to fabricate the appropriate index profile to yield high bandwidth in multimode fibers by enabling the profile in the centerline region to be tuned to a desired refractive index profile.

Thus, FIG. 12 represents a centerline profile, a cross section of an optical fiber preform for an optical fiber, or the optical fiber itself, in accordance with the present invention, wherein the centerline profile 20 has a substantially circular symmetry about centerline 22. The same uniformity or symmetry present in the preform should also be essentially preserved after being drawn into optical fiber. In addition, similar results can be achieved on single mode as well as multimode fiber core canes and the resultant optical fibers drawn therefrom. Furthermore, the circular symmetry, would extend along the entire length of an optical fiber whose preform was processed in accordance with the present invention.

Comparing the centerline profile of a fiber produced by the subject method, as shown in FIG. 12, to the centerline profile of a fiber produced by a conventional method, as shown in FIG. 1, the centerline profile of the conventionally-manufactured fibers do not exhibit such uniform symmetry and concentricity of layers. Conversely, the fiber made in accordance with the invention exhibits concentric and symmetric regions of glass about its centerline. In particular, circularity of the layers is preferably improved with the present invention.

Thus, the present invention may assist in achieving low levels of polarization mode dispersion without heavily depending upon or, without having to resort to, spinning techniques during the fiber draw step 130. Additionally, optical fiber produced with the present invention may be spun.

Multimode fiber can be manufactured using the same process as disclosed above with respect to single mode fiber manufacture. However, during the redraw and cladding deposition steps, the multimode core soot preform may not need to be closed at both ends, because attenuation may not be as critical in multimode fibers. However, the centerline aperture preferably is closed as is the case with single mode fiber described above. For multimode fiber, symmetric hole closure enables the centerline region of the fiber refractive index profile to be tuned to a desired, accurate profile shape. This enables better on center bandwidth when the resultant fiber is employed with the small spot sizes exhibited by laser sources.

The methods disclosed herein can be employed not only to close a centerline aperture 60 during consolidation, but to close the centerline aperture and/or other apertures during a separate diameter reducing step, e.g., a redraw step to make core cane. If the ratio of the outside diameter of the preform to the diameter of the hole present in the preform is sufficiently large, forces can be generated, by reducing the outside diameter of the preform, which are sufficient to close the centerline aperture. Thus, if the outside diameter of the preform is sufficiently large, a hole within the preform can be closed during a diameter reduction operation, without having to utilize significant vacuum forces. In this way, circular and/or symmetric hole closure can be enhanced.

Thus, embodiments of the present invention relate to, but are not limited to the following: a method of manufacturing a preform for an optical fiber; a method of closing the centerline aperture of a preform for an optical fiber; a method of manufacturing an optical fiber; a method of reducing the effective diameter of a centerline aperture in a preform for an optical fiber; a method of increasing the symmetry of the centermost region of a preform for an optical fiber; a method of increasing the symmetry of the centermost region of an optical fiber; a method of increasing the circularity of the centermost region of a preform for an optical fiber; a method of increasing the circularity of the centermost region of an optical fiber; a method of enhancing the circular closure of a preform for an optical fiber; and a method of reducing the polarization mode dispersion in an optical fiber which is drawn from a preform.

Also, while the invention has been disclosed herein largely with respect to the closing of centerline apertures, the methods disclosed herein are not limited to closing centerline apertures, and can be used to close virtually any void present along the length of an optical fiber preform or other intermediate glass articles for use in the manufacture of optical fiber. This includes voids that would be formed as a result of rod-in-tube manufacturing techniques, as well as voids formed by assembling a glass sleeve over pre-manufactured core blanks or canes.

Additional methods and apparatus for adjusting the pressure in the centerline aperture region of a preform can be found in U.S. application Ser. No. 09/558,770, filed Apr. 26, 2000, entitled An Optical Fiber and a Method for Fabricating a Low Polarization-Mode Dispersion and Low Attenuation Optical Fiber, which claims the benefit of U.S. Provisional Application No. 60/131,012, filed Apr. 26, 1999, entitled Optical Fiber Having Substantially Circular Core Symmetry and Method of Manufacturing the Same; and in U.S. Provisional Application No. 60/131,033, filed Apr. 26, 1999, entitled Low Water Peak Optical Waveguide and Method of Manufacturing Same, all of which are incorporated herein by reference.

In a preferred embodiment of the present invention, a consolidated preform is disposed within a furnace such that the entire preform, is exposed to a preferably isothermal heat zone which raises the temperature of the preform to between 1400° C. and 1600° C., more preferably between 1420° C. and 1550° C., and a vacuum is induced in the centerline aperture for a period of between 2 hours and 10 hours, more preferably between 3 hours and 9 hours, even more preferably between 4 hours and 8 hours, until the inside diameter of the preform defining the centerline aperture is reduced but not fully collapsed upon itself, then heating the preform (or a portion thereof) to a temperature between 1900° C. and 200° C., more preferably between 1950° C. and 2100° C. and mechanically pulling on the preform to "redraw" the preform into a reduced diameter preform or to "draw" the preform into an optical waveguide fiber, wherein the centerline aperture of the reduced diameter preform or the optical waveguide fiber fully collapses upon itself during the redrawing or drawing. Silica-based preforms suitable for the above treatment include, but are not limited to, preforms having an outer diameter of greater than 30 mm, more preferably greater than 50 mm, and having an inside diameter of less than about 10 mm, more preferably less than about 5 mm.

EXAMPLE

Figure 13:
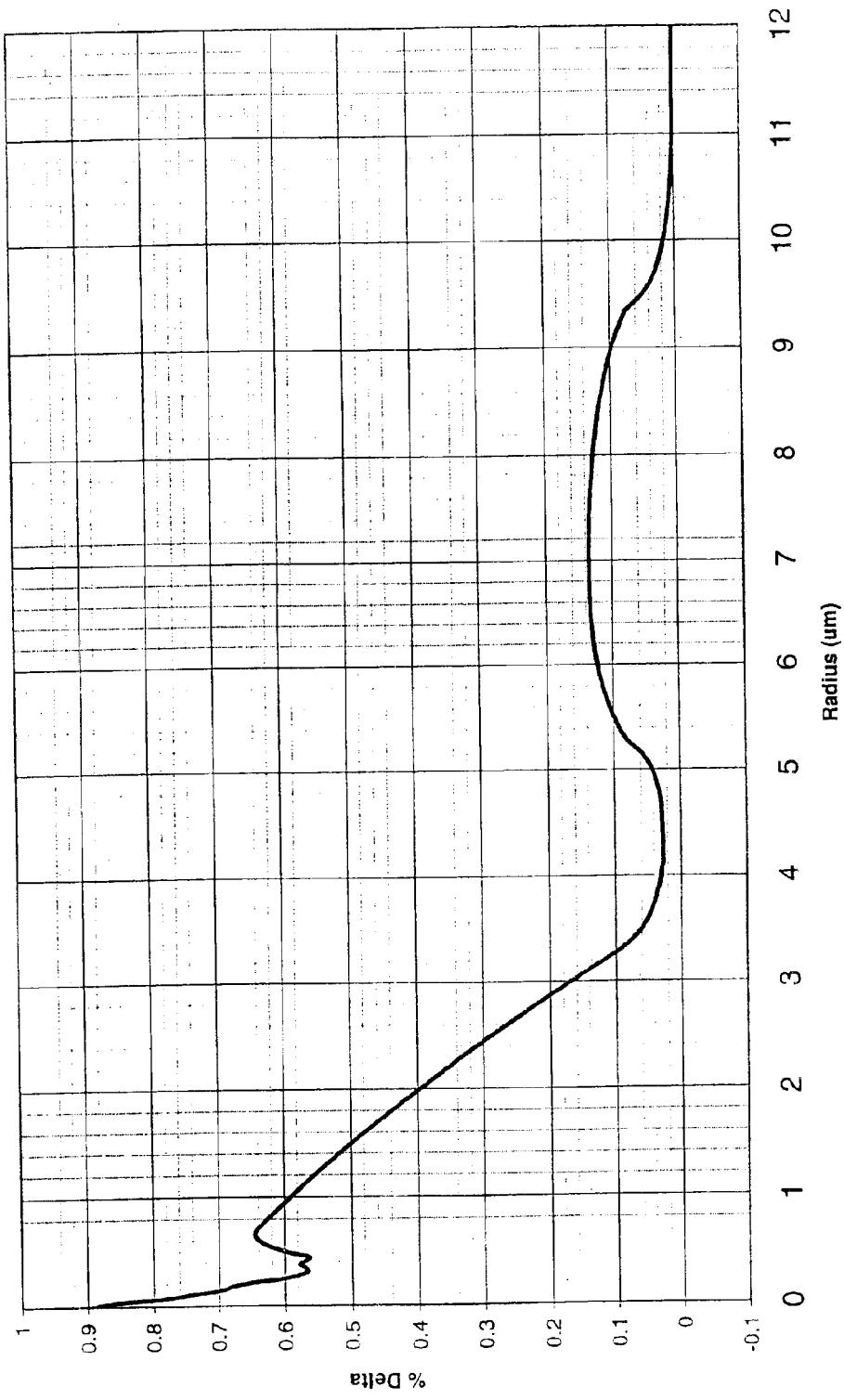
FIG. 13 shows a representative refractive index profile of an optical fiber fabricated according to the present invention.

FIG. 13 depicts the refractive index profile of the central portion of an fiber, and/or its preform, which was formed from a soot preform originally deposited on a 9.5 mm (3/8 inch) diameter bait rod. The preform and subsequently drawn fiber comprised germania doped silica and contained no fluorine. The effective area of the drawn optical fiber was greater than about 60 square microns. As seen in the refractive index profile of FIG. 13, the optical fiber has a central core region extending from the centerline to about 3.5 microns, a first annular region adjacent and surrounding the central core region and having a delta % (Δ%) greater than or equal to 0 and less than about 0.2%, more preferably less than about 0.1%, and a second annular region or ring adjacent and surrounding the first annular region and extending from a radius of about 5 microns to about 10 microns. Cladding material is adjacent and surrounding the second annular region, i.e. starting at about 10 microns, wherein the cladding preferably comprises pure silica. The soot preform was consolidated and the inside diameter shrunk to about 7 mm while the outside diameter was greater than 50 mm. For comparison with the present invention, the consolidated preform was then raised to a temperature of about 2000° C. in a redraw furnace, the pressure at the centerline aperture was reduced to about 133 Pa (1 Torr) by active evacuation, and an optical fiber preform was re-drawn from the preform. Subsequently, the optical fiber preform was then drawn into optical waveguide fiber. Unspun fiber exhibited PMD of 0.10 ps/km$^{1/2}$, and optical fiber that was spun exhibited PMD of 0.042 ps/km$^{1/2}$.

Figure 14:
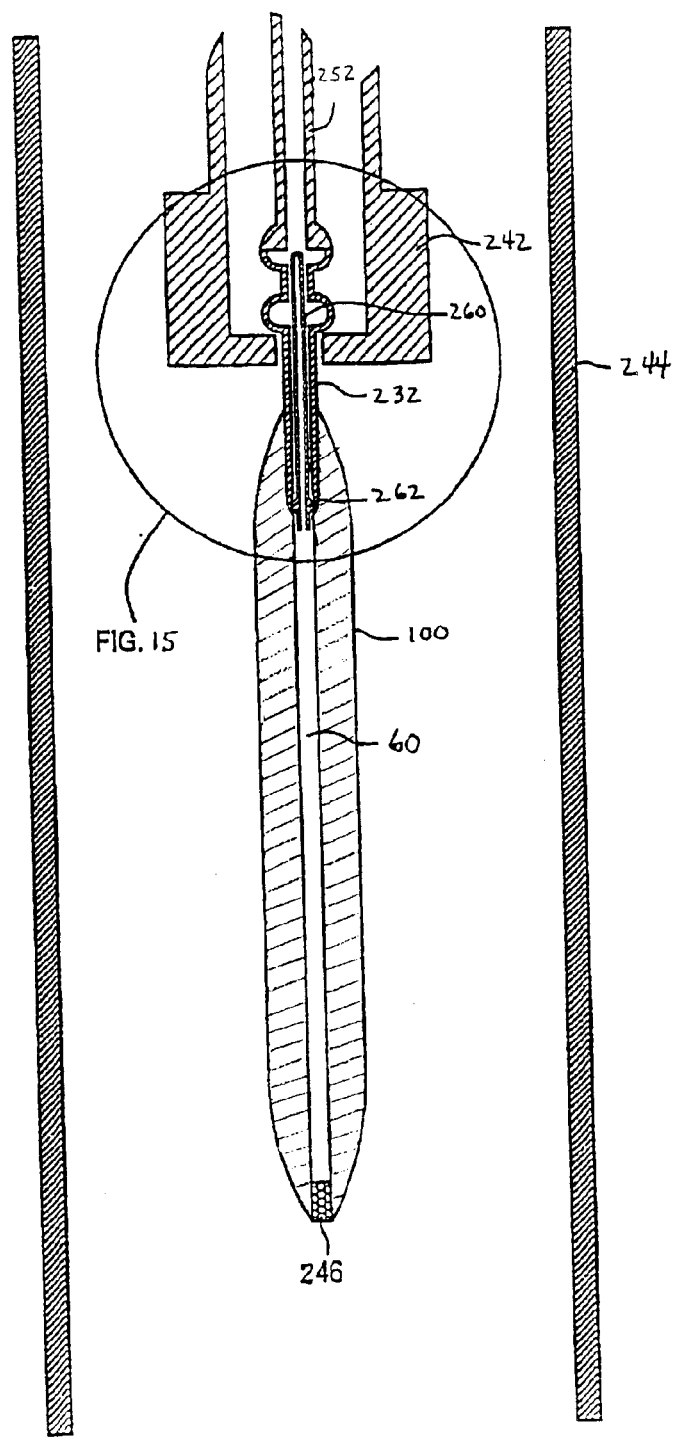
FIG. 14 is a vertical cross-sectional schematic view of a preform having a handle with a mating top plug for allowing a passively induced reduction of pressure in the centerline aperture of the preform.
Figure 15:
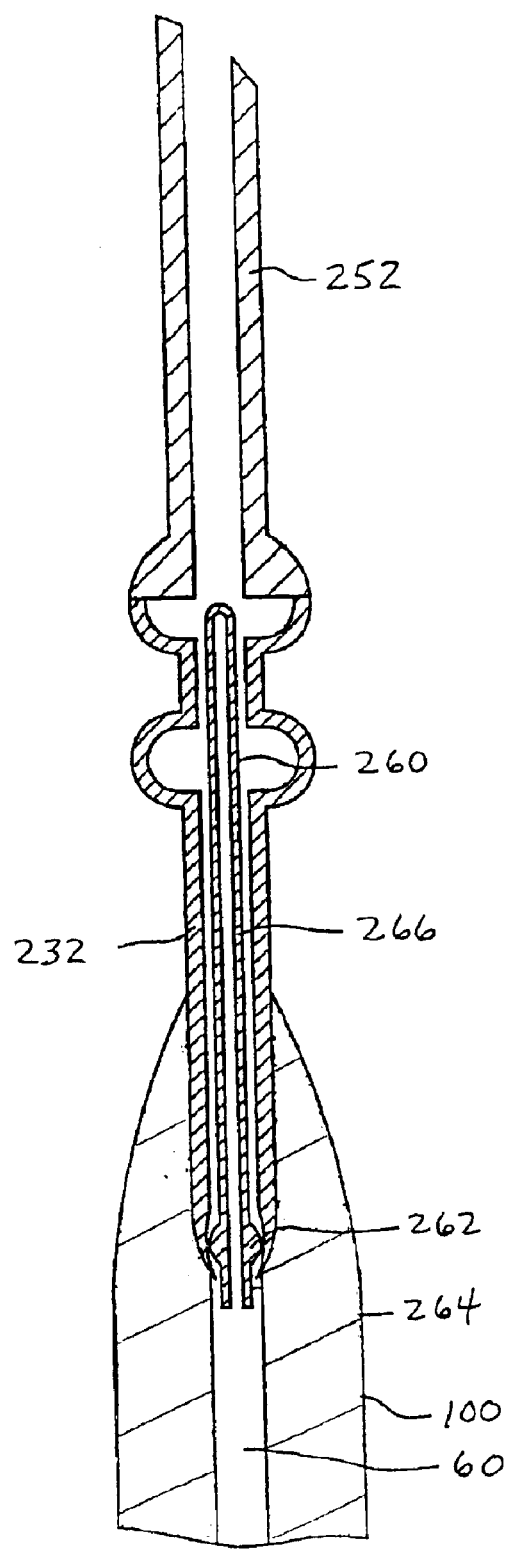
FIG. 15 is a close-up view of the top of the preform of FIG. 14.

In a preferred embodiment of the present invention, a soot preform may be formed on a handle 232 as shown in FIG. 14. Preferably, a glass body such as bottom plug 246 is positioned in centerline aperture 60 at the end of soot body 238 remote from handle 232, and a glass body such as hollow tubular glass plug or top plug 60 having a open end 264 is positioned in centerline aperture 60 in soot body 238 opposite plug 246 as shown in FIG. 14. Top plug 260 is shown disposed within the cavity of tubular handle 232. Following chlorine drying, soot body 238 is down driven into the hot zone of consolidation furnace 244 to seal off the centerline aperture 60 and consolidate soot body 238 into a consolidated glass preform. Drying and consolidation may optionally occur simultaneously. During consolidation, soot body 238 contracts somewhat and engages bottom plug 246 and the lower end of top plug 260, thereby fusing the resulting consolidated glass preform to plug 246 and plug 260 and sealing the centerline aperture 60. Sealing of both the top and bottom of centerline aperture 60 can be accomplished with one pass of soot body 238 through the hot zone. When the consolidated preform is held preferably at an elevated temperature and/or when a gas inside the centerline aperture 60 is at a higher concentration compared to outside the top plug 260, gas diffuses through the top plug and a vacuum is passively induced inside the centerline aperture 60. Preferably, top plug 260 has a relatively thin wall through which diffusion of the inert gas can more expediently occur. As depicted in FIG. 15 top plug 260 preferably has an enlarged portion 262 for supporting plug 260 within handle 232, and a narrow portion 264 extending into centerline aperture 60 of soot body 238. Plug 260 also preferably includes an elongated hollow portion 266 which may preferably occupy a substantial portion of handle 232. Hollow portion 266 provides additional volume to centerline aperture 60 thereby providing a better vacuum within centerline aperture 60 following diffusion of the inert gas. In addition, the glass plugs are preferably thin walled plugs ranging in thickness from about 200 μm to about 2 mm. Even more preferably, at least a portion of plug 260 has a wall thickness of about 0.2 to about 0.5 mm. More preferably still, elongated portion 266 has a wall thickness of about 0.3 mm to about 0.4 mm. Thinner walls promote diffusion, but are more susceptible to breakage during handling.

The consolidated preform with the handle device with a top plug having a thin wall as described above was heated to a temperature of about 1460° C. for 6 hours, then raised to a temperature of about 2000° C. and drawn into an optical preform. Optical fiber drawn from the optical fiber preform exhibited a PMD of less than about 0.015 ps/km$^{1/2}$.

In another preferred embodiment, the consolidated preform with plugged bottom and top plug with thin walled membrane was raised to a temperature of 1450° C. for 6 hours, then heated to about 2000° C. and drawn into cane.

In yet another preferred embodiment the consolidated preform with plugged bottom and top plug with thin walled membrane was raised to a temperature of 1500–1550° C. for about 2 hours, then heated to about 2000° C. and drawn into cane.

The thin-walled plug can help to prevent wetting, re-wetting, or other contamination of the centerline region of the preform.

The thin-walled plug also allows the possibility of first reducing the pressure in the centerline aperture of the preform, for example when the preform is heated to an elevated temperature or temperature range and gas diffuses through the thin wall, then the pressure in the centerline aperture may increase when the preform is subjected to an even higher temperature or temperature range, especially if the temperature/pressure increases at a rate greater than the rate of diffusion which tends to decrease the pressure.

Alternatively, the thin walled membrane, and/or the glass portion supporting the thin wall, may be broken to expose the centerline aperture 60 to the atmosphere outside the thin wall. Thus, if the pressure inside the centerline aperture 60 were lower than the pressure outside the thin wall, then the pressure in the centerline aperture would increase. Furthermore, the centerline aperture could then be actively evacuated to induce a vacuum therein. Moreover, the vacuum in the centerline aperture may be actively controlled.

Additional advantages and modifications will readily occur to those skilled in the art. Therefore, the invention in its broader aspects is not limited to the specific details, and representative devices, shown and described herein. Accordingly, various modifications may be made to the method and preform disclosed herein without departing the spirit or scope of the general inventive concept as defined by the appended claims.

What is claimed is:

1. A method of forming a preform for use in making an optical waveguide fiber, the method comprising:

providing a consolidated preform having an outer surface with an outside diameter and an inner surface with an inside diameter, the inner surface defining a centerline aperture therein;

exposing the inner surface to a first pressure, less than the pressure at the outer surface, while at least part of the preform is at a first temperature for a time sufficient to contract without fully collapsing the aperture and without pulling on the preform; and after the aperture is contracted, exposing the inner surface to a second pressure, greater than the first pressure, while at least part of the preform is at a second temperature and for a time sufficient to further contract the aperture.

2. The method of claim 1 wherein the first temperature is less than the consolidation temperature of the preform.

3. The method of claim 1 wherein the first temperature is between the consolidation temperature and the draw temperature of the preform.

4. The method of claim 1 wherein the first temperature is between about 1450° C. and about 1950° C.

5. The method of claim 1 wherein the first temperature is between about 1300° C. and about 1600° C.

6. The method of claim 1 wherein the first temperature is between about 1650° C. and about 2200° C.

7. The method of claim 1 wherein the first pressure is less than about 10 Torr.

8. The method of claim 1 wherein the first pressure is less than about 100 Torr.

9. The method of claim 1 wherein the first pressure is less than about 500 Torr.

10. The method of claim 1 wherein the second temperature is greater than the first temperature.

11. The method of claim 1 wherein the aperture is fully collapsed.

12. The method of claim 1 wherein the second pressure is greater than 500 Torr.

13. The method of claim 1 wherein the second pressure is greater than 700 Torr.

14. The method of claim 1 wherein the second pressure is greater than 760 Torr.

15. The method of claim 1 wherein the preform is fabricated via an OVD process.

* * * * *